(12) United States Patent
Endo et al.

(10) Patent No.: US 7,575,800 B2
(45) Date of Patent: Aug. 18, 2009

(54) SLIDING PARTS, PRECISION PARTS AND TIMEPIECES AND ELECTRONIC EQUIPMENT USING THE SAME

(75) Inventors: Morinobu Endo, Suzaka (JP); Tetsuo Uchiyama, Tokyo (JP); Akio Yamaguchi, Kasugai (JP); Teruaki Yuoka, Komaki (JP); Hiroshi Aoyama, Nagoya (JP); Kazutoshi Takeda, Sakura (JP); Yoshifumi Maehara, Yachiyo (JP); Masato Takenaka, Misato (JP); Koichiro Jujo, Kisarazu (JP); Shigeo Suzuki, Ichikawa (JP); Takeshi Tokoro, Tokyo (JP)

(73) Assignees: Kitagawa Industries Co., Ltd., Nagoya-shi (JP); Seiko Instruments Inc., Chiba-shi (JP)

( * ) Notice: Subject to any disclaimer, the term of this patent is extended or adjusted under 35 U.S.C. 154(b) by 628 days.

(21) Appl. No.: 10/494,000

(22) PCT Filed: Oct. 31, 2002

(86) PCT No.: PCT/JP02/11393
§ 371 (c)(1),
(2), (4) Date: Nov. 22, 2004

(87) PCT Pub. No.: WO03/037988

PCT Pub. Date: May 8, 2003

(65) Prior Publication Data
US 2005/0078561 A1    Apr. 14, 2005

(30) Foreign Application Priority Data
Nov. 2, 2001  (JP) ............................. 2001-337966
Dec. 20, 2001 (JP) ............................. 2001-387524

(51) Int. Cl.
*B32B 25/02* (2006.01)
*B32B 27/00* (2006.01)
*B32B 3/26* (2006.01)
*B32B 27/08* (2006.01)

(52) U.S. Cl. .............. 428/296.7; 428/299.1; 428/474.4; 428/411.1; 428/370; 428/412
(58) Field of Classification Search .............. 428/296.7, 428/299.1, 322, 411.1, 370, 412, 474.4
See application file for complete search history.

(56) References Cited

U.S. PATENT DOCUMENTS 4,711,584 A    12/1987   Tanazawa et al.

(Continued)

FOREIGN PATENT DOCUMENTS

CN    1030923 A    8/1989

(Continued)

OTHER PUBLICATIONS

International Search Report for PCT/JP02/11393 mailed Feb. 18, 2003, 1 pg.

(Continued)

*Primary Examiner*—D. Lawrence Tarazano
*Assistant Examiner*—Camie S Thompson
(74) *Attorney, Agent, or Firm*—Grossman, Tucker, Perreault & Pfleger, PLLC

(57) ABSTRACT

The present invention relates to sliding parts, precision parts and timepieces and electronic equipment using those parts. Sliding parts are composed by a resin in which the degree of orientation of a fibrous filler is higher at the portion serving as the sliding surface than inside the sliding part, and the fibrous filler is oriented along the sliding surface on the sliding surface. Alternatively, precision parts are composed by a resin to which has been added carbon fibers for which a carbon compound is thermally decomposed to carbon in the vapor phase and simultaneously grown directly into fibers simultaneous to this thermal decomposition. Moreover, timepieces and electronic equipment are composed by these sliding parts or these precision parts.

6 Claims, 4 Drawing Sheets

U.S. PATENT DOCUMENTS

| | | | |
|---|---|---|---|
| 4,777,204 | A | 10/1988 | Ikenaga et al. |
| 4,858,210 | A | 8/1989 | Yamada et al. |
| 5,433,906 | A * | 7/1995 | Dasch et al. ............... 264/117 |
| 5,545,686 | A | 8/1996 | Carter et al. |
| 6,426,134 | B1 | 7/2002 | Lavin et al. |
| 6,476,116 | B1 | 11/2002 | Egami et al. |
| 7,167,420 | B2 * | 1/2007 | Endo et al. ................ 368/160 |
| 2001/0030908 | A1 | 10/2001 | Moteki et al. |
| 2003/0231557 | A1 | 12/2003 | Nakajima et al. |
| 2005/0127782 | A1 * | 6/2005 | Endo et al. ............ 310/323.02 |

FOREIGN PATENT DOCUMENTS

| | | |
|---|---|---|
| EP | 0206600 | 12/1986 |
| JP | S53138870 | 11/1978 |
| JP | S58056989 | 4/1983 |
| JP | S58084258 | 5/1983 |
| JP | 6179826 | 8/1986 |
| JP | 61179826 | 8/1986 |
| JP | S61285249 | 12/1986 |
| JP | S62162687 | 10/1987 |
| JP | H03064367 | 3/1991 |
| JP | H03081370 | 4/1991 |
| JP | 7-126434 | 5/1995 |
| JP | H07229975 | 8/1995 |
| JP | H11094956 | 4/1999 |
| JP | 11-140197 | 5/1999 |
| JP | 2962320 | 10/1999 |
| JP | 11269280 | 10/1999 |
| JP | H11281762 | 10/1999 |
| JP | 2001139699 | 5/2001 |
| JP | 2001200096 | 7/2001 |
| JP | 200240511 | 2/2002 |
| JP | 2002371197 | 12/2002 |
| JP | 200312945 | 1/2003 |
| KR | 19940006469 | 7/1994 |

OTHER PUBLICATIONS

Chinese Office Action dated Sep. 23, 2005, from related Chinese application (3 pgs).

Japanese Notice of Reasons for Rejection issued on Apr. 22, 2008 in Japanese Patent Application No. 2008-540255; English language translation enclosed.

Japanese Notice of Reasons for Rejection issued on Apr. 22, 2008 in Japanese Patent Application No. 2003-540255; English language translation enclosed.

Japanese Office Action dated Aug. 19, 2008 issued in related Japanese Patent Application No. 2003-555285.

* cited by examiner

SLIDING PARTS, PRECISION PARTS AND TIMEPIECES AND ELECTRONIC EQUIPMENT USING THE SAME

TECHNICAL FIELD

The present invention relates to sliding parts, precision parts and timepieces and electronic equipment using those parts.

BACKGROUND ART

When forming sliding parts such as gears, cams, rollers, bearings and connectors in the past, composite materials were used that were composed by dispersing a fibrous filler such as glass fibers or carbon fibers in a matrix resin.

However, when producing sliding parts using a composite material like that described above, the fibrous filler may end up being oriented in a specific direction depending on the various conditions during molding (such as the shape of the molded product, locations and number of gates provided in the mold, viscosity and fibrous filler content of the composite material, and fiber length of the fibrous filler). In this case, anisotropy appears in the mechanical strength of the sliding part, thereby leading to problems such as being oriented in a direction in which there is susceptibility to the occurrence of warping in the molded product, or a direction in which there is susceptibility to breaking or cracking when an external force is applied.

On the other hand, if the fibrous filler is made to not be oriented by adjusting the aforementioned molding conditions, although the appearance of anisotropy in the mechanical strength of sliding parts as described above can be prevented, in this case, the majority of the fibrous filler present near the sliding surface of the sliding part is facing in a direction perpendicular to the sliding surface, and since the microscopic smoothness of the sliding surface is impaired as a result of this, the coefficient of friction of the sliding surface increases, thereby leading to a decrease in sliding performance.

In addition, conventional precision parts were known to be produced by using plastic for the main plate, bridge, rotor and fifth wheel-and-pinion used in timepieces. An example of this is described in Japanese Patent No. 2962320.

However, conventional precision parts have poor transferability, and there were discrepancies between the dimensions of the injection molding mold and the dimensions of the part following injection molding. Consequently, extremely small parts were unable to be molded into highly precise shapes, and in the case of wheel-and-pinions having a small outer diameter, there was the problem of being unable to produce these parts using plastic to the excessively small curvature of the tip.

In addition, conventional precision parts lack smoothness and flatness for the surface of plastic molded products, and in the case of thermoplastic resin in particular, there was the problem of insufficient strength of the plastic molded parts.

DISCLOSURE OF THE INVENTION

A sliding part of the present invention is a sliding part formed by a composite material composed by dispersing a fibrous filler in a matrix resin; wherein, the degree of orientation of the fibrous filler is higher at the portion that serves as the sliding surface than that inside the sliding part, and the fibrous filler is oriented along the sliding surface on the sliding surface.

In this sliding part, since the fibrous filler is oriented along the sliding surface at the portion serving as the sliding surface, differing from sliding parts in which fibrous filler present near the sliding surface is not oriented, the sliding surface has a high degree of microscopic smoothness, and the coefficient of friction of the sliding surface becomes lower. In addition, since the degree of orientation of the fibrous filler is lower inside the sliding part than at the sliding surface, it becomes difficult for anisotropy to appear in the mechanical strength of the sliding part as compared with sliding parts in which the fibrous filler contained throughout the sliding part is oriented to the same degree as the sliding surface.

Thus, according to this sliding part, even though it is formed with a composite material containing fibrous filler, there is no appearance of anisotropy in its mechanical strength and sliding performance is superior.

Furthermore, the fibrous filler present near the sliding surface preferably has a high degree of orientation since a higher degree of orientation results in greater precise smoothness of the sliding surface. In addition, the fibrous filler present inside the sliding part preferably has a low degree of orientation since the lower the degree of orientation, the lower the likelihood of the appearance of anisotropy in the mechanical strength of the sliding part. Incidentally, among the outer surfaces of this sliding part, fibrous filler may or may not be oriented on those surfaces other than the sliding surface.

Although the amount of fibrous filler contained in the composite material should be suitably adjusted since it varies according to the physical properties of the fibrous filler and the physical properties of the matrix resin, as a general rule, an amount of about 3% by weight to 60% by weight is suitable as the weight ratio with respect to the entire composite material. If the amount of fibrous filler is less than 3% by weight, there are many cases in which the effect of adding the fibrous filler is diminished excessively, while if the amount of fibrous filler exceeds 60% by weight, there are many cases in which the continuity of the matrix resin is lost, thereby resulting in excessively high brittleness.

Although a sliding part provided with the aforementioned characteristic structure may be produced in any manner, as a specific example of this, this sliding part can be produced according to the following method.

For example, since a long fiber length facilitates orientation while a short fiber length inhibits orientation, by suitably adjusting the fiber length, the fibrous filler can be put into a state in which it is oriented in one portion inside the cavity, but not oriented in another portion. Here, since the portion where the fibrous filler is oriented is the portion where the slippage between the matrix resin and fibrous filler when the composite material flows within the cavity is comparatively large, while the portion where the fibrous filler is not oriented is the portion where the aforementioned slippage between the matrix resin and the fibrous filler is comparatively small, fibrous filler tends to be oriented easily corresponding to the amount of the increase in flow resistance of the composite material near the inner wall of the cavity, while the fibrous filler tends to be oriented with greater difficulty the farther away from the cavity inner wall. Consequently, simply by optimizing the fiber length of the fibrous filler, molded products may be able to be produced in which the degree of orientation of the fibrous filler along the sliding surface is high at the portion that serves as the sliding surface of the sliding part, while the degree of orientation of the fibrous filler is low at the portion inside the sliding part.

In addition, in addition to optimizing the fiber length of the fibrous filler as described above, if the locations and number of gates provided in the mold, the injection pressure from the gates and so forth are adjusted corresponding to the shape of the sliding part (i.e., the shape of the cavity inside the mold), the flow direction and flow rate of the composite material can be optimized so that a composite material filled into the cavity flows rapidly in a specific direction along the sliding surface at the portion which forms the sliding surface within the cavity. Thus, the degree of orientation of the fibrous filler in a composite material filled into the cavity can be increased for the portion where the sliding surface is formed within the cavity.

Alternatively, as an example of a different production method, a first composite material containing an easily oriented first fibrous filler (e.g., that having a long fiber length) and a second composite material containing a second fibrous filler that is not easily oriented (e.g., that having a short fiber length) may be injected into a mold cavity either simultaneously or at a certain time difference, and the locations of gates provided in the mold, the injection pressure from the gates, the viscosity or each composite material and so forth may be adjusted so that mainly the first composite material flows into the portion serving as the sliding surface of the sliding part, while mainly the second composite material flows into the portion serving as the inside of the sliding part. By doing so, since the first composite material containing the easily oriented first fibrous filler is filled into the portion serving as the sliding surface of the sliding part, while the second composite material containing the second fibrous filler that is not easily oriented is filled into the inside of the sliding part, a molded product can be produced in which the degree of orientation of the fibrous filler along the sliding surface is high at the portion serving as the sliding surface of the sliding part, while the degree of orientation of the fibrous filler is low inside the sliding part.

Alternatively, the step in which the portion serving as the sliding surface of the sliding part is molded, and the step in which the inside of the sliding part is molded may be made to be separate steps, and the degree of orientation of the fibrous filler may then be optimized for each step. In the case of making these steps to be separate steps, either step may be carried out first. The method for optimizing the degree of orientation of the fibrous filler in each step is arbitrary for each step. A composite material in which the fiber length of the fibrous filler differs for each step may be used, molding conditions may be set so that the flow rates of the composite materials within the cavity vary for each step, or both of these techniques may be used in combination.

In any case, if a sliding part is produced by these production methods or other production methods in which the degree of orientation of the fibrous filler along the sliding surface is high at the portion that serves as the sliding surface of the sliding part, while the degree of orientation of the fibrous filler is low inside the sliding part, even though it may be formed with a composite material that contains fibrous filler, there is no appearance of anisotropy in mechanical strength and the resulting sliding part has superior sliding performance.

However, in the sliding part explained above, the fibrous filler is preferably composed of vapor grown carbon fibers (VGCF) having a diameter of 0.01-0.2 μm and fiber length of 1-500 μm.

In a sliding part composed in this manner, the vapor grown carbon fibers used for the fibrous filler are finer than other carbon fibers (e.g., PAN and pitch carbon fibers). The fiber length of these vapor grown carbon fibers is preferably made to be 1-500 μm. If the fiber length exceeds 500 μm, the degree of orientation of the fibrous filler inside the sliding part tends to be excessively high, while if the fiber length is less than 1 μm, the degree of orientation of fibrous filler near the sliding surface tends to be excessively low, thereby impairing smoothness of the sliding surface. In addition, the diameter of the vapor grown carbon fibers is preferably made to be 0.01-0.2 μm. If the diameter exceeds 0.2 μm, the degree of orientation of the fibrous filler inside the sliding part again tends to be excessively high, while if the diameter is less than 0.01 μm, the degree of orientation of the fibrous filler present near the sliding surface becomes excessively low.

Since a sliding part composed in this manner is formed by a composite material in which the aforementioned vapor grown carbon fibers are dispersed, it demonstrates superior sliding performance in comparison with those using other fibrous fillers. In addition, since the aforementioned vapor grown carbon fibers are extremely fine for use as fibrous filler, enabling the fibers to enter into extremely minute surface irregularities in the molded product, molded products can be obtained in which surface irregularities on the micron order formed in the inner wall of the mold cavity are faithfully reproduced, and the strength of the entire molded product, including the mechanical strength of such minute protrusions, can be increased. Thus, the aforementioned vapor grown carbon fibers are particularly preferable in the case of forming extremely small sliding parts as well as sliding parts having minute surface irregularities. Moreover, since they have a high coefficient of thermal conductivity, they are also preferable for use in sliding parts at locations requiring dissipation of heat, and since they also have a high coefficient of electrical conductivity, they also allow static electricity to be released when generated during sliding.

In addition, in the case of using such vapor grown carbon fibers as a fibrous filler, the apparent density of the aforementioned vapor grown carbon fibers is preferably 0.05-0.1 $g/cm^3$.

In a sliding part composed in this manner, since vapor grown carbon fibers having an apparent density of 0.05-0.1 $g/cm^3$ are used for the aforementioned vapor grown carbon fibers, the toughness of the molded product can be increased and a sliding part can be obtained that has superior mechanical strength. Furthermore, if the apparent density exceeds 0.1 $g/cm^3$, there is greater susceptibility to variations in the dispersivity in the resin. If the apparent density is less than 0.05 $g/cm^3$, since the brittleness of the molded product tends to increase, it becomes difficult to obtain a sliding part having superior mechanical strength.

In addition, the aforementioned vapor grown carbon fibers are preferably fired at a temperature of 2200-3000° C.

In a sliding part composed in this manner, since the vapor grown carbon fibers are fired at 2200-3000° C. causing the vapor grown carbon fibers to be graphitized, the solid lubricity of the sliding surface increases. In addition, graphitizing the vapor grown carbon fibers also offers the advantage of improving electrical and thermal conductivity. Furthermore, if the firing temperature is lower than 2200° C., the vapor grown carbon fibers are not completely graphitized, resulting in the risk of a decrease in solid lubricity. In addition, if the firing temperature exceeds 3000° C., the vapor grown carbon fibers end up decomposing, thereby making this undesirable.

Moreover, with respect to the matrix resin, the aforementioned matrix resin should be either polytetrafluoroethylene resin (PTFE), polyacetal resin (POM), polyamide resin (PA), polyethyleneterephthalate resin (PET), polybutyleneterephthalate resin (PBT), polyether ether ketone resin (PEEK), liquid crystal polymer resin (LCP), polyphenylenesulfide resin (PPS), polycarbonate resin (PC) or polyphenylene oxide resin (PPO).

Although any of these resins should be used alone, two or more types may be used as a mixture provided the mixture is a highly compatible combination or a combination in which compatibility can be enhanced by a suitable compatibility agent.

In the case of a sliding part composed in this manner, a molded product can be obtained that is able to adequately satisfy sliding performance and mechanical strength required by sliding parts.

In addition, the present invention also discloses precision parts composed of a resin to which has been added carbon fibers in which a carbon compound is thermally decomposed to carbon in the vapor phase and simultaneously grown directly into fibers simultaneous to this thermal decomposition. Furthermore, carbon compounds such as hydrocarbons can be applied for the carbon compound.

The present invention discloses precision parts in which carbon fibers are formed by a vapor phase-liquid phase-solid phase reaction system (to be referred to as a VLS reaction) that proceeds in a system in which three phases consisting of the vapor phase, liquid phase and solid phase are all present while using a transition metal as a catalyst.

The present invention discloses precision parts in which the carbon fibers are carbonaceous products heat treated at 1300° C.

The present invention also discloses precision parts in which the carbon fibers are graphitized products heat treated at 2800° C.

The present invention discloses precision parts in which the carbon fibers have a carbon interatomic distance (Co) of 6.9 Å, fiber diameter of 0.2 μm, fiber length of 10-20 μm, apparent density of 0.02-0.07 g/cm$^3$, true density of 1.9 g/cm$^3$, specific surface area of 37 m$^2$/g, hygroscopicity of 1.3%, volatile matter of 0.5-1.0%, ash content of 1.5%, pH of 5 and oxidation starting temperature of 550° C.

The present invention also discloses precision parts in which the carbon fibers have a carbon interatomic distance (Co) of 6.775 Å, fiber diameter of 0.2 μm, fiber length of 10-20 μm, apparent density of 0.02-0.08 g/cm$^3$, true density of 2.1 g/cm$^3$, specific surface area of 15 m$^2$/g, hygroscopicity of 0.2%, volatile matter of 0.1-0.2%, ash content of 0.1%, pH of 7 and oxidation starting temperature of 650° C.

The present invention discloses precision parts in which the aforementioned resin is at least one resin among polyacetal resin, polyamide resin, polyphenylenesulfide resin and polycarbonate resin. As a result of using such a resin, the precision part can be used for extremely small parts in which the outer diameter of a gear molded by injection molding is 0.2 mm, or parts such as gears having portions having an extremely small curvature.

In the present invention composed in this manner, the following advantages are obtained: (1) plastic precision parts can be made to have an extremely fine shape; (2) the end curvature of gears can be made to be small; (3) the strength of plastic molded products is improved in the case of thermoplastic resins; (4) wear resistance is improved; (5) transferability is improved as a result of reducing the discrepancy between the dimensions of the injection molding mold and the dimensions of injection molded plastic products; (6) the smoothness and flatness of the surfaces of plastic molded products are improved; (7) thermal conductivity is satisfactory; (8) there is no adherence of debris or fuzz; and (9) injection molded products can be obtained that have thin portions. In addition, the smallest plastic gears in the world, having an outer diameter of 0.2 mm, can be provided by injection molding. Moreover, by utilizing these advantages in a timepiece, precision parts formed with metal materials can be reduced in weight and produced at lower costs. Moreover, by applying the present invention to the shaft of a gear, since lubricity is imparted to the shaft, the use of lubricating oil used for bearings along with its filling step are eliminated, thereby making it possible to realize elimination of the use of lubricating oil in a so-called timepiece assembly process. The reasons behind the realization of the aforementioned advantages lie in the physical and mechanical properties of the carbon fibers used in the present invention including: (1) superior dispersivity in the case of composing as a composite with resin since the Van der Waal's force (bonding force) between the graphite layers is weak, (2) superior transferability to the degree that even scratches in the injection molding mold are transferred due to satisfactory thermal conductivity, (3) production of precision products due to superior temperature characteristics, namely small coefficients of thermal expansion and thermal contraction, and (4) appearance of mechanical strength due to interaction between the carbon fibers and resin.

The present invention also discloses a timepiece in which these precision parts or sliding parts are used.

In addition, the present invention discloses electronic equipment provided with the aforementioned sliding parts or precision parts.

BEST MODE FOR CARRYING OUT THE INVENTION

First Embodiment

Figure 1:
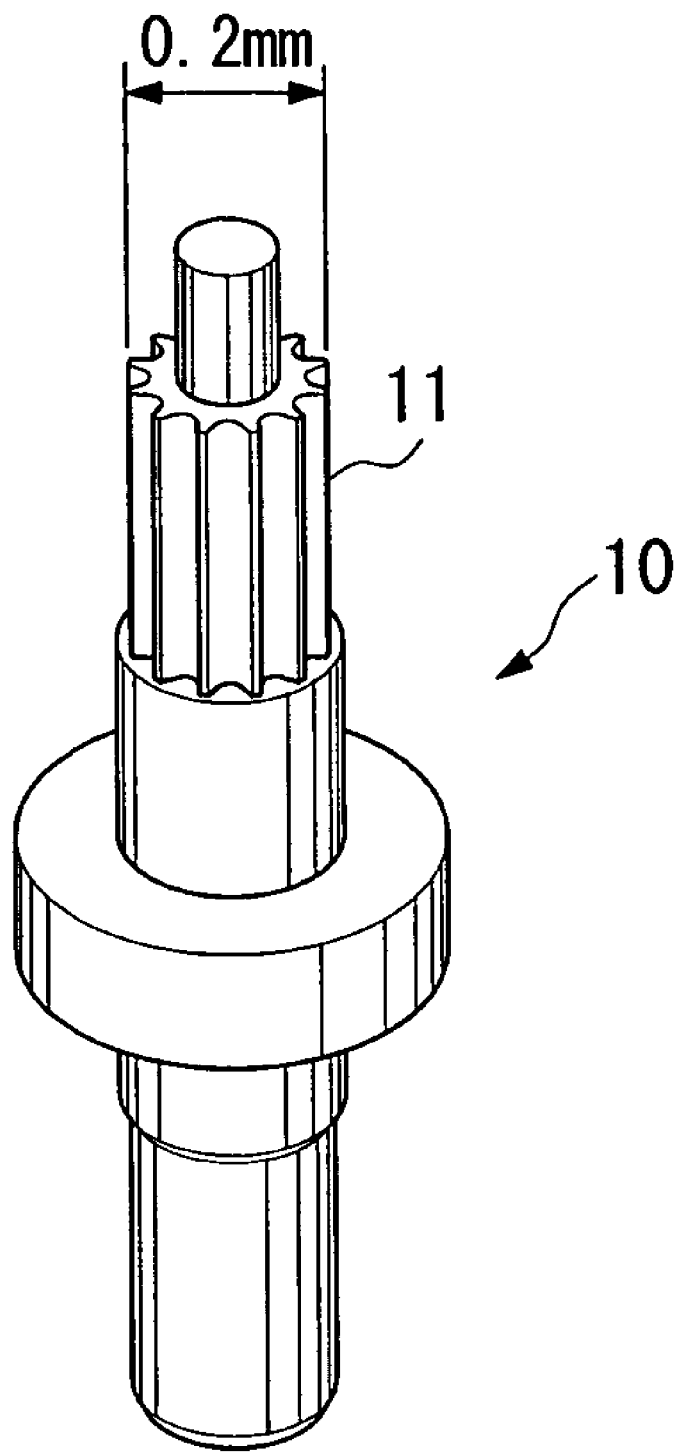
FIG. 1 is a perspective view showing the overall structure of a precision part as claimed in a third embodiment of the present invention.

The following provides an explanation of examples of embodiments of the sliding parts of the present invention.

80% by weight of polyamide resin 12 (PA12) having a molecular weight of 14000 and melt viscosity of 800 poise, and 20% by weight of vapor grown carbon fibers having an average fiber diameter of 0.2 μm, average fiber length of 20 μm and apparent density of 0.07 g/cm$^3$ pre-fired at 2800° C., were respectively weighed, kneaded and extruded into the shape of φ3 mm strands at a temperature of 230° C. with a double-screw extruding machine followed by palletizing to obtain a raw material.

This raw material was then loaded through material feed port of an injection molding machine, plasticized at cylinder temperatures of 210° C., 220° C., 230° C. and 220° C. in that order followed by injection of the aforementioned melted material into a metal mold having a cavity in the shape of a thin plate at an injection pressure of 44 MPa and injection rate of 100mm/s. The temperature of the metal mold was set to 60° C.

After allowing a suitable cooling time to elapse, the metal mold was opened, the material was pushed out of the metal mold with an ejector pin and the molded product was placed in a plastic container.

The coefficient of dynamic friction of the surface corresponding to the sliding surface of the resulting molded product was 0.25 and the specific wear rate was $3.8 \times 10^{-13}$ mm/N·km, thereby having superior performance as a sliding part.

In addition, when the surface corresponding to the sliding surface of the resulting molded product was observed with a scanning electron microscope, the vapor grown carbon fibers were oriented uniaxially in parallel with the sliding surface on the surface corresponding to the sliding surface. In addition, when a plurality of cross-sections having mutually different normal directions were observed with a scanning electron microscope, the degree of orientation of vapor grown carbon fibers inside the molded product was lower than on the sliding surface, and the vapor grown carbon fibers were oriented in random directions.

When tensile rupture strength was measured in the same direction as a reference direction and in a direction perpendicular to the reference direction by taking the direction in which the vapor grown carbon fibers were oriented on the aforementioned sliding surface to be the reference direction, the tensile rupture strength was nearly equal for both directions.

In this manner, according to the aforementioned molded product, even though it is formed with a composite material containing fibrous filler and the fibrous filler is oriented on a sliding surface, anisotropy does not appear in its mechanical strength, and the sliding performance of the sliding surface exhibits an extremely superior value.

Although the above has provided an explanation of an embodiment of a sliding part of the present invention, the present invention is not limited to the aforementioned specific embodiment, but rather can be carried out in various other modes.

For example, although polyamide resin (PA) was used for the matrix resin in the aforementioned embodiment, various other types of engineering plastics may also be used for the matrix resin. Specific examples of engineering plastics that can be used include polytetrafluoroethylene resin (PTFE), polyacetal resin (POM), polyethyleneterephthalate resin (PET), polybutyleneterephthalate resin (PBT), polyether ether ketone resin (PEEK), liquid crystal polymer (LCP), polyphenylene-sulfide resin (PPS), polycarbonate resin (PC) and polyphenylene oxide resin (PPO).

In addition, although vapor grown carbon fibers having specific physical properties were used for the fibrous filler in the aforementioned embodiment, any fibrous filler can be used provided the degree of orientation near the sliding surface is higher than that within the sliding part, and it is oriented along the sliding surface near the sliding surface. However, in the case there are minute surface irregularities in the sliding part, it is better to use a fine fibrous filler, and vapor grown carbon fibers having a diameter of 0.01-0.2 μm and fiber length of 1-500 μm are preferable with respect to this point. In addition, in this case, the apparent density of the vapor grown carbon fibers is more preferably 0.05-0.1 g/cm$^3$, and the vapor grown carbon fibers are more preferably fired at a temperature of 2200-3000° C.

Second Embodiment

Next, an explanation is provided of an embodiment of precision parts of the present invention.

Carbon fibers as claimed in the precision parts of the present invention are carbon fibers in which a carbon compound such as a hydrocarbon is thermally decomposed in the vapor phase and simultaneously grown directly into fibers simultaneous to this thermal decomposition. These carbon fibers are formed by a VLS reaction that proceeds in a system in which three phases consisting of the vapor phase, liquid phase and solid phase are all present while using a transition metal as a catalyst. These carbon fibers are either carbonaceous products heat treated at 1300° C. (Carbon Fiber A) or graphitized products heat treated at 2800° C. (Carbon Fiber B). Carbon Fiber A has a carbon interatomic distance (Co) of 6.9 Å, fiber diameter of 0.2 μm, fiber length of 10-20 μm, apparent density of 0.02-0.07 g/cm$^3$, true density of 1.9 g/cm$^3$, specific surface area of 37 m$^2$/g, hygroscopicity of 1.3%, volatile matter of 0.5-1.0%, ash content of 1.5%, pH of 5 and oxidation starting temperature of 550° C. Carbon Fiber B has a carbon interatomic distance (Co) of 6.775 Å, fiber diameter of 0.2 μm, fiber length of 10-20 μm, apparent density of 0.02-0.08 g/cm$^3$, true density of 2.1 g/cm$^3$, specific surface area of 15 m$^2$/g, hygroscopicity of 0.2%, volatile matter of 0.1-1.2%, ash content of 0.1%, pH of 7 and oxidation starting temperature of 650° C.

Next, an explanation is provided of the case of adding various resins to these carbon fibers. The resins used consisted of polyacetal resin, polyamide resin, polyphenylenesulfide resin and polycarbonate resin. When the carbon fibers were added to these resins, fluidity during injection molding can be improved and the occurrence of shrink marks in the molded precision parts can be decreased. For example, when carbon fibers are added to polyamide resin at 20% by weight and 40% by weight, although the coefficient of friction is 0.5 in a resin product to which they have not been added, the coefficient of friction in resin products to which they have been added becomes 0.2, making it possible to improve wear resistance considerably. However, if the amount of carbon fiber added is not suitable, gas is generated during injection molding thereby preventing injection molding from being carried out. For example, when carbon fibers are added to polyacetal resin, gas is generated during injection molding if the amount added is not less than 20% by weight. Accordingly, the amount of carbon fiber added to polyacetal resin is preferably within the range of no more than 20% by weight. An amount of 20% by weight or 40% by weight is suitable when adding carbon fibers to polyamide resin. When carbon fiber is added to polyphenylenesulfide resin, resin fluidity during injection molding worsened due to the amount added not being less than 20% by weight. Accordingly, the amount of carbon fiber added to polyphenylenesulfide resin is preferably within the range of no more than 20% by weight.

Table 1 shows the basic characteristics of polyamide resin 12 (PA12), polyacetal resin (POM) and polycarbonate resin (PC) to which has been added 10% by weight or 20% by weight of the aforementioned fibrous filler (carbon fibers). Furthermore, for the sake of comparison, a non-composite material to which fibrous filler has not been added (resin only) is shown as a "Blank".

Each of the aforementioned resins was injected molded according to molding conditions as shown in Table 2. Namely, a composite material in which 20% by weight of fibrous filler was added to PA12 was injection molded at temperatures of the nozzle, front portion (weighing portion), middle portion (compressing portion), rear portion (feeding portion) and molding mold of 220° C., 230° C., 220° C., 210° C. and 70° C., respectively, while the same temperatures for a non-composite material of PA12 were 190° C., 200° C., 180° C., 170° C. and 70° C., respectively. In addition, a composite material in which 20% by weight of fibrous filler was added to POM was injection molded by setting each of the aforementioned temperatures to 200° C., 210° C., 190° C., 170° C. and 60° C., respectively, while the same temperatures for a non-composite material of POM were set to 180° C., 185° C., 175° C., 165° C. and 60° C., respectively. Moreover, a composite material in which 20% by weight of fibrous filler was added to PC was injected molded by setting each of the aforementioned temperatures to 290° C., 310° C., 290° C., 270° C. and 80° C., respectively, while the same temperatures for a non-composite material of PC were set to 280° C., 290° C., 270° C., 260° C. and 80° C., respectively. Furthermore, the same conditions as in the case of addition of 20% by weight were used for a composite material in which 10% by weight of fibrous filler was added to PA12.

Here, the coefficient of dynamic friction, specific wear rate (mm$^3$/N·km) and critical PV value (kPa·m/s) indicate values when a resin fragment of a predetermined shape ($\phi$55 mm×thickness: 2 mm) was slid over a copperplate (S45C) at a velocity of 0.5 m/sec while applying surface pressure of 50 N.

Furthermore, these measurements are carried out in accordance with plastic sliding wear testing methods (JIS (Japanese Industrial Standard) K7218).

Measurement of specific gravity is carried out in accordance with the density and specific gravity measurement methods for plastics and non-foam plastics (JIS K7112 (Method A)).

In addition, tensile rupture strength (MPa) refers to the tensile stress at the moment the test piece ruptures, while tensile rupture elongation (%) refers to the elongation corresponding to tensile rupture strength.

Tensile rupture strength and tensile rupture elongation are measured in accordance with plastic tension test methods (JIS K7113) using JIS No. 1 testpieces.

In addition, bending strength (MPa) and bending elastic modulus (MPa) are measured using a plastic testpiece measuring 80 mm×10 mm×2 mm, and are measured in accordance with plastic bending characteristics testing methods (JIS K7171).

Moreover, volume resistivity ($\Omega$·cm) is measured for a plastic testpiece measuring 100 mm×80 mm×2 mm using an MCP-T600 resistivity meter (Loresta GP, Dia Instruments) or MCP-HT450 resistivity meter (Hiresta UP, Dia Instruments).

Thermal conductivity (W/m·K) is measured for a plastic testpiece measuring 100 mm×80 mm×2 mm using the QTM-500 thermal conductivity meter (Quick Thermal Conductivity Meter, Kyoto Electronics Manufacturing).

TABLE 1

| Item | Units | PA12 VGCF 20 wt % | PA12 VGCF 10 wt % | PA12 Blank | POM VGCF 20 wt % | POM Blank | PC VGCF 20 wt % | PC Blank |
|---|---|---|---|---|---|---|---|---|
| Coefficient of dynamic friction | — | 0.25 | | 0.56 | 0.46 | 0.33 | 0.18 (*brittle) | 0.51 |
| Specific wear rate | mm$^3$/N·km | $3.8 \times 10^{-13}$ | | $5.2 \times 10^{-11}$ | $3.3 \times 10^{-9}$ | $1.3 \times 10^{-9}$ | $3.3 \times 10^{-8}$ | $8.1 \times 10^{-8}$ |
| Critical PV value | KPa·m/s | 1547 | | 765 (melt) | 1056 (melt) | 765 (melt) | 1056 (melt) | 765 (melt) |
| Avg. surface roughness | nm | 35.9 | 131.9 | 184.6 | | | | |
| Specific gravity | — | 1.13 | 1.07 | 1.02 | 1.51 | 1.41 | 1.30 | 1.20 |
| Tensile rupture strength | MPa | 56.5 | 49.0 | 41.4 | | 60 | | 69 |
| Tensile rupture elongation | % | 16 | | $\geq$300 | | 40 | | 115 |
| Bending strength | Mpa | 71.9 | | 54.9 | | 90 | | 93 |
| Bending elastic modulus | Mpa | 3090 | | 1400 | | 2580 | | 2350 |
| Volume resistivity | $\Omega$·cm | $3.3 \times 10^3$ | $1.4 \times 10^{13}$ | $1.2 \times 10^{14}$ | $2.4 \times 10^0$ | $1 \times 10^{14}$ | $1.48 \times 10^3$ | |
| Thermal conductivity | W/m·K | 1.49 | 0.82 | 0.30 | | | | |

TABLE 2

|  | PA12 | | POM | | PC | |
| --- | --- | --- | --- | --- | --- | --- |
|  | VGCF | Blank | VGCF | Blank | VGCF | Blank |
| Nozzle | 220° C. | 190° C. | 200° C. | 180° C. | 290° C. | 280° C. |
| Front | 230° C. | 200° C. | 210° C. | 185° C. | 310° C. | 290° C. |
| Middle | 220° C. | 180° C. | 190° C. | 175° C. | 290° C. | 270° C. |
| Rear | 210° C. | 170° C. | 170° C. | 165° C. | 270° C. | 260° C. |
| Metal mold temperature | 70° C. | 70° C. | 60° C. | 60° C. | 80° C. | 80° C. |

As shown in Table 1, in the case of PA12 and PC, composite materials to which fibrous filler had been added exhibited improved basic characteristics as compared with non-composite materials not containing fibrous filler, the amount of improvement with respect to tensile rupture strength, volume resistivity and thermal conductivity was found to increase the greater the amount of fibrous filler added.

Here, the coefficient of dynamic friction is an indicator of the smoothness and flatness of the surfaces of the aforementioned composite materials, and by composing a gear with a composite material having a small coefficient of dynamic friction, for example, the gear can be rotated more smoothly. In contrast to the surface roughness of PA12 being about 185 nm, when fibrous filler was added at 10% by weight and 20% by weight, surface roughness improved to about 132 nm and about 36 nm, respectively. Surface roughness was measured with Nanopics 1000 and NPX100 desktop compact probe microscopes (Nanopics, Seiko Instruments).

In addition, the amount of improvement in volume resistivity is significantly larger in the case of adding fibrous filler at 20% by weight than in the case of adding at 10% by weight. Volume resistivity is an indicator of the ease of acquiring an electrostatic charge, with it being more difficult to acquire an electrostatic charge the smaller the value of volume resistivity, thereby making it more difficult for debris and fuzz to adhere. Consequently, as a result of making the content of fibrous filler in the composite materials 10% by weight, the problem of debris and so forth becoming trapped in a gear made of such a composite material and causing equipment to operate improperly can be avoided. In addition, the effect against static electricity is even more pronounced when fibrous filler is added at 20% by weight. Moreover, in the case of molding a composite material by injection molding, since the amount of time in which the composite material can be removed from the metal mold is dependent upon the cooling rate (namely, the ease of cooling) of the composite material, increasing the thermal conductivity of a composite material can be expected to improve the production efficiency of the composite material.

Furthermore, although the coefficient of dynamic friction increases slightly in the case of a composite material in which fibrous filler is added to POM a compared with that not containing fibrous filler, since there are improvements in all other basic characteristics, characteristics can be said to be improved overall.

In the present embodiment, a prototype of a timepiece gear was fabricated by injection molding using resin to which carbon fibers had been added. The fabricated timepiece gear was made to have roughly the same level of dimensions as the dimensions of the initial drawing, and was demonstrated to have superior transferability of the fibrous filler-containing resin of the present invention. In addition, carbon fibers were uniformly filled into the ends and edges of the timepiece gear during molding, there was no deviation of carbon fibers in the composite of resin and carbon fibers within the injection molding machine, and the carbon fibers were determined to be uniformly dispersed. In addition, resin to which carbon fibers were added has the advantages of being able to be purged rapidly when changing the material during injection molding, and there is no unused resin material remaining in the hopper.

Third Embodiment

Next, an explanation is provided of an embodiment of precision parts of the present invention.

The smallest plastic gear 10 in the world having an outer diameter of the gear portion having six teeth of 0.2 mm was produced (see FIG. 1). PA12 was used for the resin, and carbon fibers were added at 20% by weight. When this gear 10 was assembled in a timepiece and operated, it reliably demonstrated the function of a gear. The present invention demonstrates that extremely small parts can be provided by resin injection molding, and is able to contribute to the reduced size of timepiece and other precision parts. Furthermore, although Carbon Fiber A was explained in the second embodiment as being a carbonaceous product that is heat treated at 1300° C., it can be used practically provided it is a carbonaceous product that is heat treated at 1000-1500° C. Similarly, although carbon fiber B was explained in the second embodiment as being a graphitized product that is heat treated at 2800° C., it can be used practically provided it is a graphitized product that is heat treated at 2200-3000° C.

Fourth Embodiment

Next, an explanation is provided of an embodiment of precision parts of the present invention.

A main plate, a train wheel bridge, a fifth wheel-and-pinion and a rotor were produced using a resin to which carbon fibers had been added as claimed in the present invention.

Figure 2:
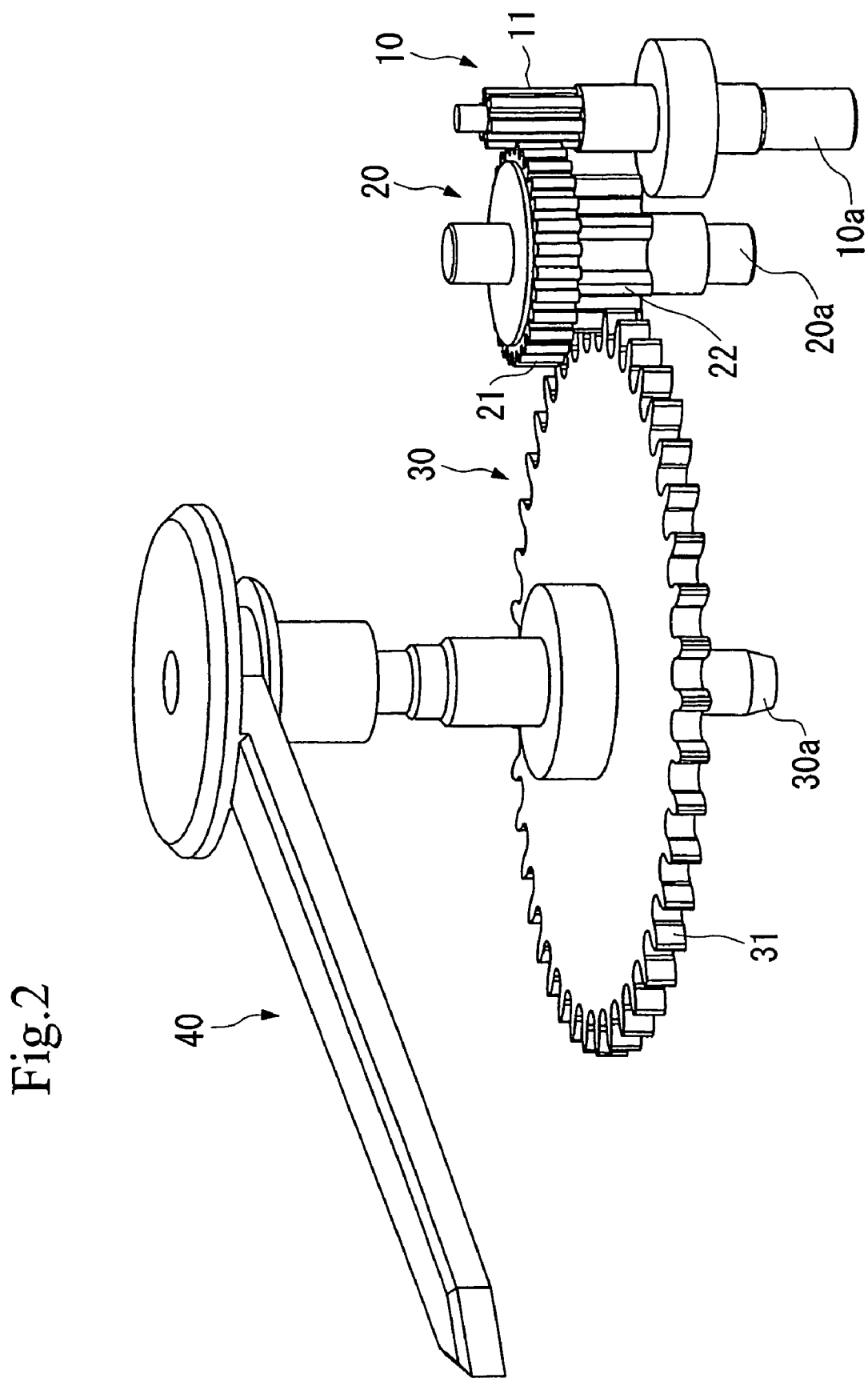
FIG. 2 is a perspective view showing the main structure of a timepiece as claimed in a fourth embodiment of the present invention.
Figure 3:
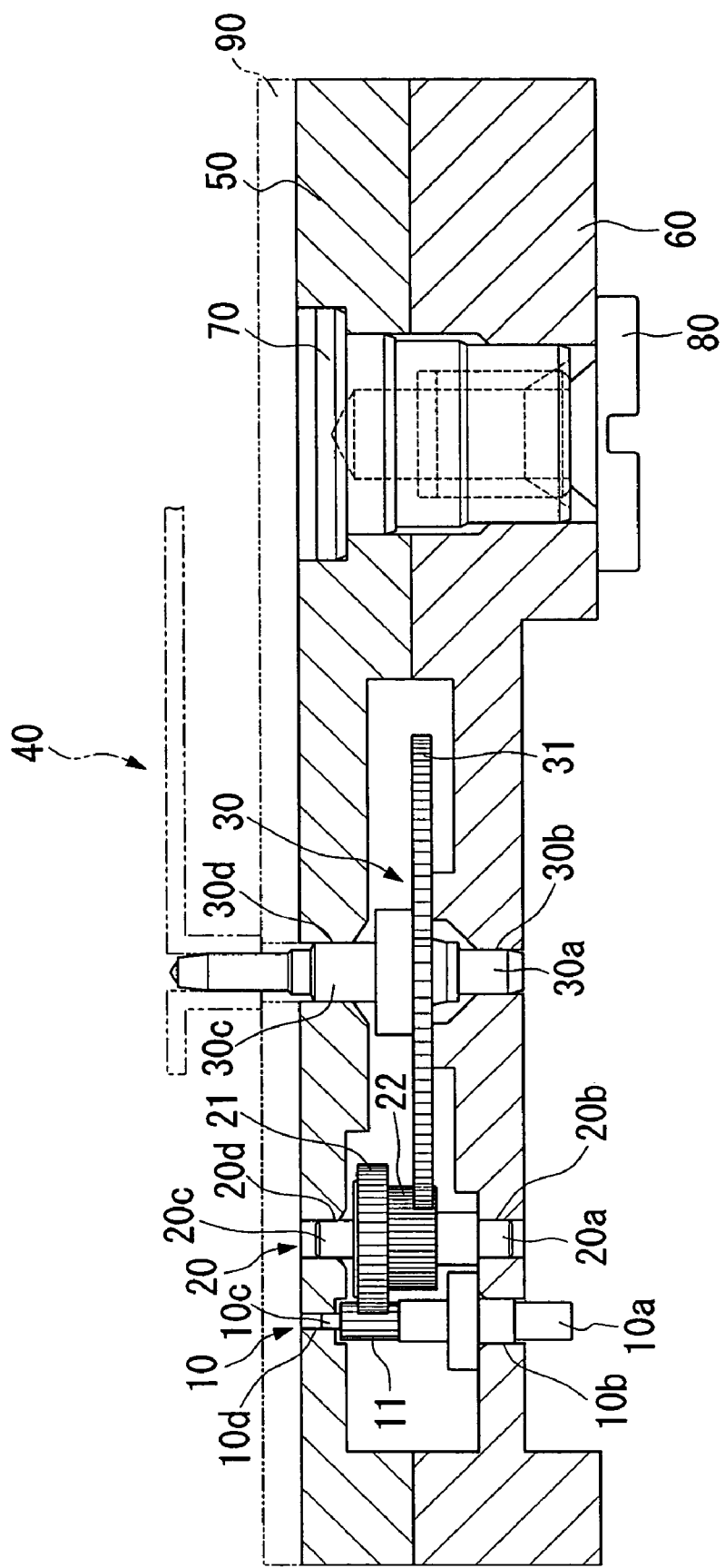
FIG. 3 is a cross-sectional view showing the main structure of a timepiece as claimed in a fourth embodiment of the present invention.

FIGS. 2 and 3 show the essential structure of a timepiece of the present embodiment, and each of the wheel-and-pinions 10, 20 and 30, main plate 50 and train wheel bridge 60 in the form of precision parts that compose this timepiece are respectively composed of a composite material (resin to which fibrous filler has been added) as claimed in the aforementioned first embodiment or second embodiment. Fourth wheel-and-pinion 30, fifth wheel-and-pinion 20 and sixth wheel-and-pinion 10 compose train wheels by meshing with gear 11 of sixth wheel-and-pinion 10 and gear 21 of fifth wheel-and-pinion 20 and with gear 22 of fifth wheel-and-pinion 20 and gear 31 of fourth wheel-and-pinion 30, and shafts 10a through 30a on the side of train wheel bridge 60 of each wheel-and-pinion 10 through 30 are rotatably supported by bearings 10b through 30b of train wheel bridge 60, respectively. In addition, shafts 10c through 30c on the side of main plate 50 of each wheel-and-pinion 10 through 30 are rotatably supported by bearings 10d through 30d of main plate 50, respectively. This train wheel is rotated by a stepping motor (not shown) that drives sixth wheel-and-pinion 10 so as to rotate second hand 40 attached to fourth wheel-and-pinion 30. Furthermore, train wheel bridge 60 is fastened to main plate 50 by screw pin 70 and screw 80. Moreover, dial 90 is fastened to main plate 50 by press-fitting the protrusion (not shown) of dial 90 into an indentation (not shown) in main plate 50.

The dimensions of these precision parts were made to be nearly at the same level as the dimensions shown in the drawings. In addition, there was found to be no adherence of debris or fuzz to those parts in which carbon fibers were added to the resin, and those parts were determined to function normally. In addition, with respect to durability as well, when these parts were assembled in the timepiece, fifth wheel-and-pinion 20 and the rotor were able to rotate despite not applying lubricating oil. Moreover, even when rotated 100,000 times, the timepiece was able to run and there was no wear of parts. Thus, the use of parts in which carbon fibers have been added to the resin makes it possible to produce a timepiece that can run without the application of lubricating oil. As a result, the need for a lubrication step in the production process is eliminated, and the need for a lubrication step during maintenance can also be similarly eliminated. In addition, since lubrication steps are not required, the use of lubricating oil can be discontinued, thereby offering the advantage of lowering production costs. Moreover, there is also the advantage of the timepiece not being caused to stop running due to the presence of debris or fuzz.

Fifth Embodiment

The following provides an explanation of an embodiment of precision parts or sliding parts of the present invention.

Figure 4:
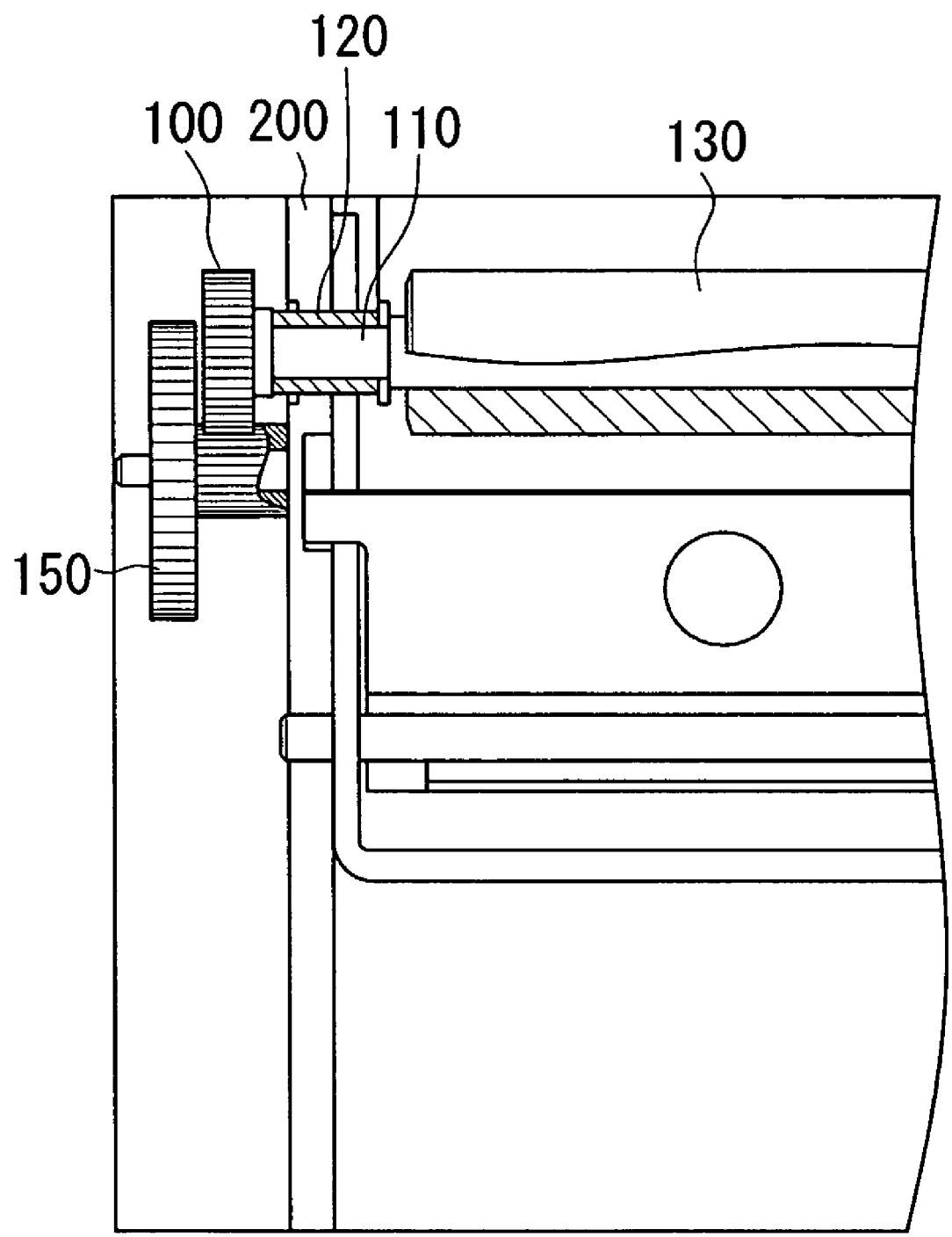
FIG. 4 is a cross-sectional view showing the main structure of a printer as an example of electronic equipment as claimed in a fifth embodiment of the present invention.

Gears 100 and 150 and bearing 120 were produced in the form of sliding parts or precision parts from a composite material in which a fibrous filler was added to a resin as claimed in the present invention, and a printer was produced as shown in FIG. 4 using these gears.

FIG. 4 is an enlarged view of the drive mechanism of a printer. Shaft 110 of roller 130 is rotatably attached to frame 200 by bearing 120 composed of the composite material as claimed in the aforementioned first embodiment or second embodiment (resin to which has been added a fibrous filler), and gear 100 composed of the aforementioned composite material is provided on the end of that shaft. Gear 150 composed of the aforementioned composite material meshes with this gear 100, and roller 130 is rotated by driving this gear 150 with a drive motor (not shown).

Since the printer of the present embodiment uses gears 100 and 150 as well as bearing 120 composed of the aforementioned composite material for the drive mechanism that drives roller 130, the adherence of debris and fuzz, etc. to the meshing portions of these gears 100 and 150 as well as to bearing 120 can be prevented, and the rotary driving of roller 130 can be carried out smoothly without using lubricating oil.

Furthermore, the present invention is not limited to the aforementioned embodiments, but rather can be modified in various ways within a range that does not deviate from the gist of the present invention.

For example, although gears were indicated as examples of precision parts or sliding parts in the aforementioned second through fifth embodiments, the aforementioned composite material can also be applied to other shafts and bearings such as shafts, bearings, guides and hinges, mechanical parts used to transfer rotary power such as chains, belts, cams and rollers, as well as rotating mechanical products such as gear pumps.

INDUSTRIAL APPLICABILITY

In the sliding parts of the present invention, since a fibrous filler is oriented along the sliding surface in the portion serving as the sliding surface, differing from parts in which fibrous filler present near the sliding surface is oriented, the sliding surface has a high degree of microscopic smoothness, and the coefficient of friction of the sliding surface becomes lower. In addition, since the degree of orientation of the fibrous filler is lower inside the sliding part than at the sliding surface, it becomes difficult for anisotropy to appear in the mechanical strength of the sliding part as compared with sliding parts in which the fibrous filler contained throughout the sliding part is oriented to the same degree as the sliding surface.

Thus, according to this sliding part, even though it is formed with a composite material containing fibrous filler, there is no appearance of anisotropy in its mechanical strength and sliding performance is superior.

In addition, as was previously explained, according to the present invention, the following advantages are obtained: (1) parts can be made to have an extremely fine shape; (2) the end curvature of gears can be made to be small; (3) the strength of plastic molded products is improved in the case of thermoplastic resins; (4) wear resistance is improved; (5) transferability is improved as a result of reducing the discrepancy between the dimensions of the injection molding mold and the dimensions of injection molded plastic products; (6) the smoothness and flatness of the surfaces of plastic molded products are improved; (7) thermal conductivity is satisfactory; (8) there is no adherence of debris or fuzz; and (9) injection molded products can be obtained that have thin portions. In addition, the smallest plastic gears in the world, having six teeth and an outer diameter of 0.2 mm, can be provided by injection molding. Moreover, by utilizing these advantages in a timepiece, precision parts formed with metal materials can be reduced in weight and produced at lower costs. Moreover, by applying the present invention to the shaft of a gear, since lubricity is imparted to the shaft, the use of lubricating oil used for bearings along with its filling step are eliminated, thereby making it possible to realize elimination of the use of lubricating oil in a so-called timepiece assembly process.

What is claimed is:

1. A sliding part formed by a composite material comprising a fibrous filler dispersed in a matrix resin; wherein, the degree of orientation of the fibrous filler is higher at the portion that serves as the sliding surface than that inside the sliding part, and the fibrous filler is oriented along the sliding surface on the sliding surface, and the fibrous filler consists of vapor grown carbon fibers having the density of 0.05-0.1 g/cm$^3$.

2. The sliding part according to claim 1 wherein, the vapor grown carbon fibers have a diameter of 0.01-0.2 μm and a fiber length of 1-500 μm.

3. The sliding part according to claim 1 or 2 wherein the matrix resin is either polytetrafluoroethylene resin, polyacetal resin, polyamide resin, polyethylene-terephthalate resin, polybutyleneterephthalate resin, polyether ether ketone resin, liquid crystal polymer resin, polyphenylenesulfide resin, polycarbonate resin or polyphenylene oxide resin.

4. A timepiece equipped with sliding parts according to any of claims 1 and 2.

5. Electronic equipment equipped with sliding parts according to any of claims 1 and 2.

6. The sliding part according to claim 2, wherein the vapour grown carbon fibers are fired at a temperature of 2200-3000° C. and are graphitized.

* * * * *